US008417416B2

(12) United States Patent
Bohlender et al.

(10) Patent No.: US 8,417,416 B2
(45) Date of Patent: *Apr. 9, 2013

(54) ELECTRIC AUXILIARY HEATING UNIT FOR A MOTOR VEHICLE

(75) Inventors: Franz Bohlender, Kandel (DE); Michael Zeven, Herxheim-Hayna (DE); Ulrich Mundt, Herxheim (DE)

(73) Assignee: Catem GmbH & Co. KG, Herxheim Bei Landau (DE)

( * ) Notice: Subject to any disclaimer, the term of this patent is extended or adjusted under 35 U.S.C. 154(b) by 988 days.

This patent is subject to a terminal disclaimer.

(21) Appl. No.: 12/357,131

(22) Filed: Jan. 21, 2009

(65) Prior Publication Data

US 2009/0192671 A1    Jul. 30, 2009

(30) Foreign Application Priority Data

Jan. 24, 2008  (EP) .................................... 08001350

(51) Int. Cl.
*G06F 7/00*  (2006.01)
(52) U.S. Cl. .......................................... 701/36; 219/202
(58) Field of Classification Search .................. 701/36; 219/202
See application file for complete search history.

(56) References Cited

U.S. PATENT DOCUMENTS

| | | | |
|---|---|---|---|
| 5,003,785 A | 4/1991 | Petri et al. | |
| 5,948,297 A | 9/1999 | Haubner et al. | |
| 6,515,448 B2 | 2/2003 | Iritani et al. | |
| 7,075,034 B2 * | 7/2006 | Bargheer et al. | 219/202 |
| 7,477,969 B2 * | 1/2009 | Panic | 701/36 |
| 2004/0031602 A1 * | 2/2004 | Sugiura | 165/203 |
| 2004/0195870 A1 | 10/2004 | Bohlender et al. | |
| 2005/0061798 A1 * | 3/2005 | Uhl | 219/494 |
| 2005/0085968 A1 | 4/2005 | Panic | |
| 2005/0238339 A1 | 10/2005 | Bargheer et al. | |
| 2006/0162359 A1 * | 7/2006 | Fujiki et al. | 62/236 |

(Continued)

FOREIGN PATENT DOCUMENTS

| | | |
|---|---|---|
| DE | 19850827 A1 | 5/2000 |
| EP | 1511651 A | 3/2005 |

(Continued)

OTHER PUBLICATIONS

European Search Report issued May 7, 2009 for European Patent No. 08 001 350.1.

(Continued)

*Primary Examiner* — Thomas Black
*Assistant Examiner* — Shardul Patel
(74) *Attorney, Agent, or Firm* — Boyle Fredrickson, S.C.

(57) ABSTRACT

An electric auxiliary heating unit for a motor vehicle reliably avoids temperature overshoots of the heated air, especially during acceleration phases of the vehicle. The temperature of adjustment the discharged hot air is adjusted in dependence upon the vehicle speed. This is preferably done via a stored characteristic field via which a plurality of vehicle parameters, such as the vehicle speed, the opening condition of the convertible top, the outside temperature, etc., can easily be taken into account. The temperature of the incoming air can also be derived from temperature values which are already available in the vehicle. This heating can preferably be used locally in the vehicle, e.g. in the vehicle seat or in the rear of the passenger compartment. Temperature fluctuations in the heated air can be avoided reliably and easily even in the case of dynamically varying operating conditions of the motor vehicle.

28 Claims, 6 Drawing Sheets

U.S. PATENT DOCUMENTS

| | | |
|---|---|---|
| 2006/0175877 A1 | 8/2006 | Alionte et al. |
| 2006/0209921 A1* | 9/2006 | Brown et al. ................. 374/109 |
| 2008/0300749 A1 | 12/2008 | Hartmann et al. |

FOREIGN PATENT DOCUMENTS

| | | | |
|---|---|---|---|
| JP | 2220919 A | 9/1990 |
| JP | 523247 A | 2/1993 |
| JP | 10508809 A | 9/1998 |
| JP | 2000142095 A | 5/2000 |
| JP | 2001026214 A | 1/2001 |
| JP | 2002362127 A | 12/2002 |
| JP | 2005132370 A | 5/2005 |
| JP | 3928247 B2 | 6/2007 |
| JP | 2007308045 A | 11/2007 |
| JP | 2007331738 A | 12/2007 |
| WO | WO0026047 | * | 5/2000 |

OTHER PUBLICATIONS

U.S. Appl. No. 12/357,112, filed Jan. 21, 2009.

* cited by examiner

ELECTRIC AUXILIARY HEATING UNIT FOR A MOTOR VEHICLE

BACKGROUND OF THE INVENTION

1. Field of the Invention

The invention relates to an electric auxiliary heating for a motor vehicle. In particular, the invention relates to an auxiliary heating comprising, in addition to a heating element, also a control unit for controlling the heating power that has to be generated by the heating element.

2. Description of the Related Art

For enhancing the comfort when driving with an open convertible top, heatings have already been used for a fairly long time for preventing draught phenomena in cabriolets. In these heatings, the air sucked in and discharged by a blower is heated making use of the waste heat of the engine or of additional heating modules and is then blown into the passenger compartment of the motor vehicle. In addition, also the vehicle seats can be provided with air discharge openings so as to conduct a current of hot air around the neck area of a vehicle passenger. The heating power of such heatings installed in fittings, seats or other parts of the vehicle is normally manually determined by the user, but the user does not have much influence on the precise temperature and intensity of the air discharged from the heating.

For supplying hot air to the neck area of a vehicle passenger, DE 100 54 009 A1, for example, discloses a wind protection device for an open motor vehicle in which the air current discharged from an air current opening provided in the seat is controlled in dependence upon the vehicle speed. In said DE 100 54 009 A1 the intensity of the air current is increased when the vehicle speed increases, whereas it is decreased when the vehicle speed is reduced. In addition, the heating power is adapted to the changed intensity of the air current so that the temperature of the air discharged from said air current opening is maintained constant. The air current control described in DE 100 54 009 A1 is therefore very complex because the blower as well as the heating power have to be controlled.

Moreover, DE 100 54 009 A1 does not take into account that the heating elements used for heating the air entail inertia effects occurring when the heating power changes. For example, if there is an extreme increase in the air current volume during an acceleration phase of the vehicle, a PTC heating element will, due to its inertia, not be able to provide the heating power required for maintaining the temperature of the discharged air current constant. It follows that insufficiently heated air will be blown onto the vehicle passenger's neck during the acceleration phase, whereby undesired draught phenomena will occur.

Similar problems also arise during heavy deceleration of the vehicle. Due to the inertia of the heating element, the heating power cannot be reduced as fast as the air current volume decreases. Hence, air having an excessively high temperature is blown onto the vehicle passenger's neck during said deceleration.

OBJECT OF THE INVENTION

It is therefore the object of the present invention to provide an improved electric auxiliary heating unit or simply "auxiliary heating" by means of which the above-described problems can be avoided.

According to the present invention, this object is achieved by the features of the independent claims. Advantageous embodiments with expedient further developments of the present invention are disclosed in the subclaims.

It is the particular approach of the present invention that, instead of the volume of the air current discharged from the auxiliary heating, the temperature of said air current is adjusted in dependence upon the vehicle speed. According to the present invention, the electric auxiliary heating comprises at least one PTC heating element which heats the air flowing through the auxiliary heating, and a control unit which adjusts the heating power generated by the heating element. In order to compensate speed-dependent influences, e.g. influences caused by the slipstream, the control unit adjusts, in dependence upon the vehicle speed, the temperature of the air discharged from the auxiliary heating.

It follows that, according to the present invention, temperatures which are pleasant for the vehicle passenger are produced in the passenger's neck area. According to the prior art, the air flow rate is changed in dependence upon the vehicle speed in order to achieve this purpose. When this course of action is adopted, it is, however, difficult to maintain the temperature of the discharged air constant. Whenever the air volume flowing through is changed, hot or cold air is blown onto the passenger's neck area for a short period of time. Making use of the method according to the present invention and of the heating according to the present invention, these drawbacks can be avoided in an efficient manner and the structural design of the electric auxiliary heating can additionally be simplified.

According to a preferred embodiment, the control unit adjusts a basic value for the heating power that is generated for varying the temperature of the discharged air; starting from this basic value, the heating power is varied in dependence upon the speed of the vehicle. This basic value can preferably be preselected, e.g. by a vehicle passenger, or it is adjusted automatically in response to an external parameter, e.g. the outside temperature.

It follows that the temperature of the hot air discharged can easily be adapted to the needs of a vehicle passenger or to external influences. This is of advantage, especially in cases where the auxiliary heating is used in the neck area of a vehicle passenger. When the driver drives with an open convertible top, the chilliness of the wind and, consequently, the intensity of the draught phenomena are significantly influenced by the outside temperature. As has already been described, many heatings additionally offer various comfort stages which can be selected manually by the vehicle passenger and which each have assigned thereto a specific heating power intensity. By taking into account a basic value, individual requirements specified by the vehicle passenger or influences of the outside temperature can thus be taken into consideration in the temperature control of the discharged air.

In addition to the selection of a comfort stage of the heating, most vehicles also offer the possibility of adapting the air flow rate of the heating to individual needs. It is, for example, possible to choose blower stages for adjusting the number of revolutions of the blower which supplies air to the heating. For taking this circumstance into account, the auxiliary heating, when adjusting the basic value, preferably takes into consideration the volume of the air mass flow through the auxiliary heating.

Since the dependency of the heating power, which has to be generated for varying the temperature, on the vehicle speed is often not exactly known theoretically, the auxiliary heating preferably stores a characteristic field which describes the dependency of the heating power on the vehicle speed. Such a characteristic field can e.g. be determined experimentally in an easy manner.

Also the temperature of the sucked-in cold air has an essential influence on the heating power required. For adjusting the heating power to be generated, the auxiliary heating additionally comprises, in accordance with a preferred embodiment, a temperature determination unit which determines the temperature—referred to hereinbelow as "cold air temperature"—of the air to be heated by the auxiliary heating. Based on the cold air temperature ascertained, the control unit determines the heating power to be generated by the heating element additionally in dependence upon said cold air temperature.

Due to the determination of the temperature of the cold air to be heated, the heating power to be generated can be adapted exactly to the properties of the incident air. The speed-dependent control of the hot air temperature of the air discharged from the heating can be adapted precisely to the vehicle speed in this way. If the air to be heated is, for example, very cold, a higher heating power will be necessary for heating said air to a predetermined temperature, whereas a lower heating power will suffice to heat air which is not so cold. Since the exact temperature of the air discharged from the auxiliary heating depends on the cold air temperature and on the heating power, this temperature can be controlled much more effectively.

The temperature determination unit preferably determines the cold air temperature by making use of at least one measured temperature value. For improving the determination of the cold air temperature, a correction factor can additionally be used. The use of a correction factor makes it superfluous to employ a sensor, which is arranged in the air duct in front of the heating element, for measuring the temperature of the air to be heated. This temperature may rather be determined from temperature values which are made available by other components of a vehicle, such as the air conditioning system. In the recirculated air mode of the ventilation/heating, the temperature of the sucked-in air can easily be determined on the basis of the temperature in the passenger compartment of the vehicle, whereas in the flowthrough mode, in which fresh outer air flows into the vehicle, the outside temperature on the vehicle represents a good value for the cold air temperature.

For determining the cold air temperature from a temperature value detected in the vehicle, at least one correction factor is preferably used, said correction factor compensating the difference between the measured temperature and the exact temperature of the air to be heated. This temperature difference is often not constant when the vehicle is in operation. For taking into account this temporal variation, the temperature determination unit uses, according to a further advantageous embodiment, correction factors which correct the temporal variation of the cold air relative to the measured temperature value.

Since in a vehicle travelling with an open convertible top or open windows, the outside temperature will have a significant influence on the cold air temperature of the air to be heated, the cold air temperature is preferably determined on the basis of a weighted combination of a temperature inside the vehicle and a temperature outside the vehicle.

Alternatively, the temperature determination unit according to the present invention makes use of a temperature sensor used for measuring the cold air temperature and arranged in the air intake section between a blower and the heating element. Since the cold air temperature is often not measured directly in front of the heating element, said cold air temperature may perhaps slightly change after the temperature measurement and before the air is heated. Hence, a correction factor which takes into account deviations from the measured value is preferably used in addition.

Since the parameters required for determining the heating power to be generated, such as the heating characteristics of the heating element or the vehicle-dependent influences, are often not theoretically known, the auxiliary heating preferably stores a characteristic field which describes, in dependence upon input values, the heating power to be generated. The control of the auxiliary heating can be effected by a combination of mathematical formulae and of the characteristic field. The control unit may also execute the adjustment of the heating power completely by means of characteristic fields.

According to a preferred embodiment, the auxiliary heating additionally comprises a blower which supplies the cold air to be heated to the heating element. By integrating the blower in the auxiliary heating, the production of vehicles can be facilitated, since separate operating steps are no longer necessary for installing the auxiliary heating and the blower.

Making use of the present invention, an electric auxiliary heating can easily be used anywhere in a motor vehicle as a self-sufficiently operating auxiliary heating. Said auxiliary heating is therefore particularly suitable for effecting local heating and it can be mounted at arbitrary positions of use, e.g. in vehicle seats, in the rear of the passenger compartment, in the floor room, in the B or C columns of a motor vehicle. Especially the precise determination of the heating power to be generated allows the use of the auxiliary heating in close vicinity to the vehicle passengers. The auxiliary heating is therefore preferably provided in a vehicle seat which supplies the seat, back or neck area of a passenger with hot air.

Other advantages, features and details of the present invention can be seen from the description of preferred embodiments following hereinbelow and from the figures, in which:

DETAILED DESCRIPTION OF THE PREFERRED EMBODIMENT

Figure 1:
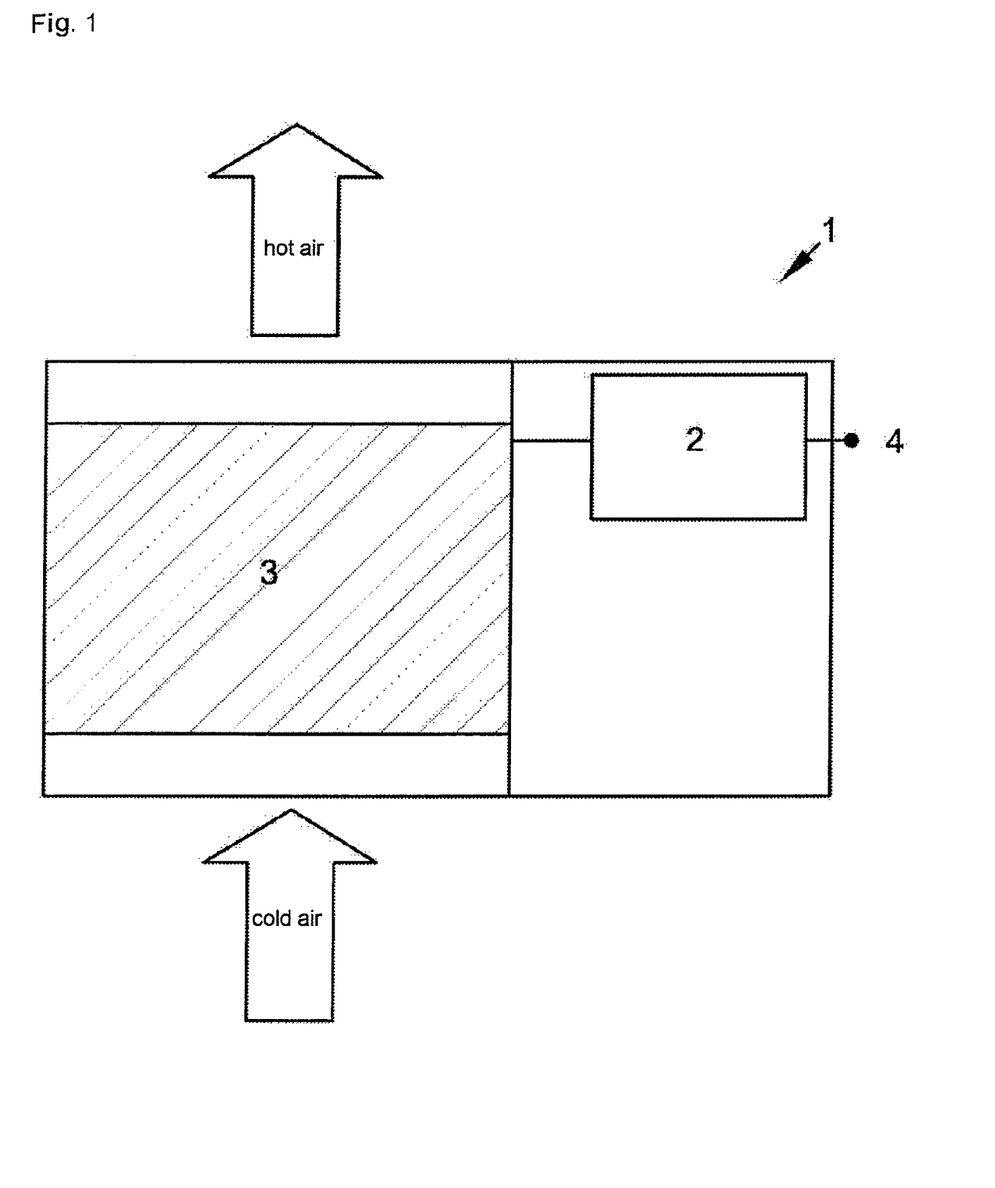
FIG. 1 shows a schematic structural design of the electric auxiliary heating according to the present invention.

FIG. 1 shows the schematic structural design of the electric auxiliary heating unit or simply "auxiliary heating" of the present invention according to a first embodiment. The auxiliary heating 1 includes a heating section 3 comprising one or a plurality of PTC heating elements and radiator elements for transferring the heating power to the air flowing through the radiator elements, as well as a control unit 2 for adjusting the heating power of said one or plurality of heating elements.

For connecting the auxiliary heating 1 to other components in a vehicle, the auxiliary heating 1 is provided with a terminal 4. This terminal can be used for supplying to the control unit 2 parameter values determined in or at the motor vehicle, e.g.

parameter values from a vehicle speed sensor or from a temperature sensor. Also user-defined predetermined specifications or signals of other vehicle components can be transmitted to the control unit 2 via this terminal.

The auxiliary heating 1 can be connected directly to external devices of the vehicle in an analog or digital fashion. In this case, a high expenditure of cables will, however, be necessary, since each external device must separately be connected to the auxiliary heating 1. In order to avoid this problem, it becomes increasingly common to use a bus, e.g. a CAN or LIN bus, in vehicles. This bus transmits signals of a plurality of devices to other devices of the vehicle by means of a single line. Making use of the terminal 4, the auxiliary heating 1 can easily be connected to such a data bus and further process the signals received via the bus. For example, the control unit 2 can receive via said bus a signal indicating the speed of the vehicle.

A person skilled in the art will, however, be aware of the fact that the above-described use of the terminals only serves as an example, and that the terminals offer a large number of possibilities of influencing the auxiliary heating.

According to a special embodiment of the present invention, the auxiliary heating is additionally provided with a blower. The blower produces an air current blowing air, which has been heated through the heating elements, into the passenger compartment through a discharge opening. This embodiment will be described in detail hereinbelow in connection with FIG. 5.

The control of the temperature of the discharged air is based on a signal that allows conclusions to be drawn about the vehicle speed. This signal can e.g. be a tachometer signal indicating the precise vehicle speed value. Alternatively, the signal may also be the wheel speed or the gear rotation speed and originate e.g. from the antilock brake system. On the basis of this signal, the control unit 2 controls the temperature of the air discharged from the auxiliary heating so that the air temperature will rise as the vehicle speed increases and fall as the vehicle speed decreases.

In the following, various exemplary embodiments of the present invention will be described, which represent the speed-dependent control of the temperature of the discharged air.

The special approach of the present invention is to be seen in the fact that, other than in the case of the prior art, the air flow rate is decoupled from the vehicle speed. In order to achieve pleasant temperatures in the neck area when the vehicle speed changes, the air flow rate is maintained substantially constant and the temperature of the discharged air is varied.

For achieving a constant air flow rate through the auxiliary heating, the blower speed remains at the same value independently of the instantaneous speed of the vehicle. An increase or a decrease in the heating power will therefore directly result in a corresponding increase or decrease in the temperature of the air current discharged from the auxiliary heating. It follows that, even with due regard to the above-described inertia of the heating element, it will be possible to avoid the disadvantageous temperature fluctuations, which may occur in conventional auxiliary heatings, during strong speed variations.

A constant air flow rate does, within the scope of the present invention, not mean that the air flow rate is invariable. It goes without saying that a different air flow rate can be preselected by the user. The air flow rate may also vary in dependence upon other parameters, but not in dependence upon the vehicle speed. For this purpose, the control unit 2 can receive via the terminal 4 a signal which provides information on the intensity of the air current and which is emitted by the blower or by some other component of the vehicle. This signal can e.g. provide information on the number of revolutions of the blower or on a selected ventilation stage. On the basis of the signal received, the control unit 2 adapts the heating power to the change in the air volume so that an increase in the air current intensity will preferably lead to a corresponding increase in the heating power and a reduction of the air current will preferably lead to a corresponding reduction of the heating power.

As has already been mentioned, the temperature of the air current discharged from the auxiliary heating is controlled by varying the heating power. In so doing, the heating power transferred to the air to be heated by the heating element or elements is adapted to the vehicle speed in such a way that an increase in speed will also lead to an increase in the temperature of the air and a decrease in speed will lead to a decrease in the temperature of the air. The speed dependency of the heating power and, consequently, the speed dependency of the discharged air can be controlled in several ways.

This can be done e.g. by making use of linear or non-linear functional relationships which describe the dependency of the heating power from the vehicle speed or the wheel speed. It is also possible to use a characteristic which reflects the dependency of the heating power on the vehicle speed and possible other parameters. In this case, the computing effort for determining the heating power can be avoided. The person skilled in the art is, however, aware of the fact that there are also other possibilities for determining the necessary heating power and that the above-mentioned methods are only examples.

For executing the functions described hereinbefore and hereinbelow, the control unit 2 may e.g. contain a memory unit (not shown) for storing control programs, function routines or characteristics, which define the control of the heating element. In addition, the control unit 2 preferably includes, in this case, a processor which executes the programs stored in the memory unit. The person skilled in the art is, however, aware of the fact that a speed-dependent control of the hot air temperature can also be realized in some other way.

It is also possible to update the control programs stored in the memory units or to service the control unit 2 via the terminal 4.

The control of the heating power can easily be achieved through a suitable selection of the strength of the current flowing through the heating element (or through a plurality of preferably separately controllable PTC heating elements). Depending on the number of separately controllable heating stages of the auxiliary heating, power semiconductors, which adjust the current to be supplied to each heating stage, are normally used for this purpose.

By means of the control according to the present invention, the heating power transferred by the heating element or elements to the air flowing through the auxiliary heating is adapted to the vehicle speed in such a way that an increase in speed will also result in an increase in the air temperature without any disadvantageous control overshoots. Unpleasant excessive heating of the heated air current can be avoided reliably.

In the case of the speed-dependent variation of the hot air temperature of the air discharged from the auxiliary heating, it is advantageous to take into account not only the vehicle speed but also the outside temperature. As has already been described, many heatings additionally offer various comfort stages which can be selected manually by the vehicle passenger and which have each associated therewith a specific heating power intensity.

In order to take this into account, the heating power, which is used for varying the temperature of the heated air, is preferably adjusted in dependence upon the vehicle speed starting from a basic value that can be preselected by a passenger of the vehicle. This basic value can, in addition to, or instead of a manual input, also be adjusted automatically by the control unit or by an air conditioning system in dependence upon an external parameter, such as the outside temperature or the degree to which a convertible top or a window has been opened. In this case, the control unit 2 assigns to each basic value and each comfort stage, respectively, speed-dependent heating power values. The present invention is, however, not limited to the use of exact heating power values. Alternatively, it is e.g. possible to store for each comfort stage a specific heating power as a basic value, and for each basic value correction values which indicate how the basic value must be decreased or increased in dependence upon the vehicle speed. It is also possible to store precise temperature values for only one comfort stage and to use for the other comfort stages correction values indicating how the stored temperatures must be adapted in dependence upon the respective comfort stage selected. The person skilled in the art is, however, aware of the fact that he has a plurality of possibilities of varying the heating power in a speed-dependent manner, starting from one or a plurality of basic values.

As has already been described hereinbefore, it is an important feature of the present invention that the air flow rate through the auxiliary heating is not varied in a speed-dependent manner, but this feature does not mean that the present invention completely excludes a variation of the air current intensity.

Modern ventilation systems offer e.g. a plurality of blower stages which can be selected by a passenger of the vehicle. In addition, the air conditioning system may change over, manually or automatically, from the fresh-air mode to the recirculated air mode en-route, whereby variations may occur in the intensity of the air current blown by a blower into the passenger compartment.

For taking into account such variations of the air current intensity, it is preferably the basic value of the heating power that is adapted to the manually or perhaps automatically selected air current intensity so as to prevent a change of the temperature of the discharged air in the case of variations of the air flow rate. It follows that a variation of the ventilation comfort stage leads to a corresponding change of the heating power to be generated.

In order to compensate inertia effects in the case of a change of load, i.e. in the case of a non-continuous change of the power to be generated by the heating element, the heating power generated by the heating element 3 is preferably controlled such that, when a change of load occurs, said heating power will initially deviate from the predetermined target value for a certain period of time.

Figure 2:
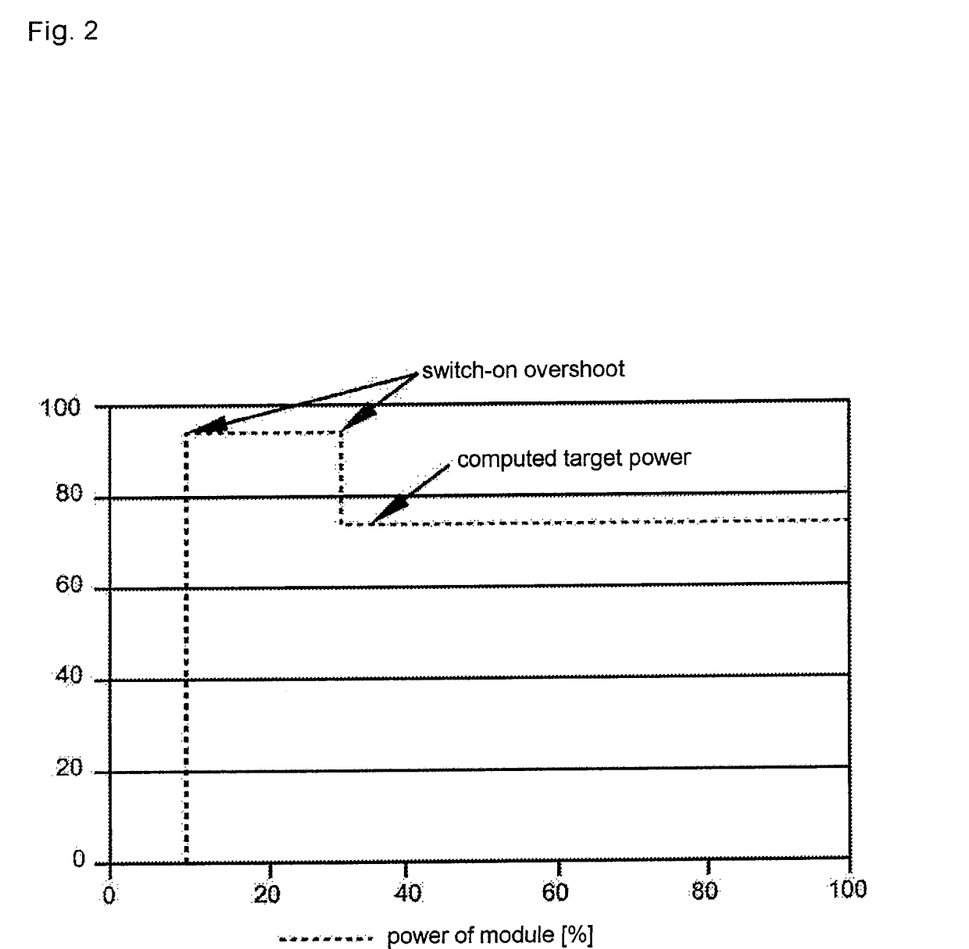
FIG. 2 shows a variation over time of the heating power absorption of the auxiliary heating according to the present invention in the case of a change of load.

FIG. 2 shows an exemplary time-dependent characteristic of the heating power generated by a heating element 3 in the case of an increase in the air current intensity and a resultant increase in the heating power to be generated. In order to heat the discharged air more rapidly and in order to compensate the inertia of the heating element, the heating element is, in response to a positive change of load, e.g. an increase in the comfort stage, temporarily supplied with a heating energy which is higher than that associated with the current vehicle speed . By selecting a higher heating power, it is achieved that, in spite of the inertia, the air will be heated as desired.

Likewise, the control unit 2 is configured such that, in response to a negative change of load, e.g. the selection of a lower comfort stage, the heating energy chosen for the heating element is lower than the heating energy set for the respective vehicle speed. This selection of a lower heating power will prevent a possible rise in the blow-out temperature, which may be caused by the energy stored in the thermal mass of the heating element in connection with a lower air flow rate. It follows that, due to the fact that the heating power to be generated is reduced in the case of a negative change of load, an overshoot of the blow-out temperature and a resultant excessive heating effect are avoided.

The heating element or elements are preferably controlled through pulse width modulation (PWM). The heating power is adjusted via the duty cycle. When a change of load takes place, this duty cycle is either increased (in the case of a positive change of load, when switching to a higher comfort stage is effected) or decreased (in the case of a negative change of load, i.e. when switching to a lower comfort stage is effected) for a short period of time. A theoretical determination of the exact control of the temporal increase or decrease of the duty cycle is, however, difficult. Depending on the requirements to be fulfilled, it is therefore preferably empirically determined in a vehicle-dependent manner.

Even though the switch-on overshoot shown in FIG. 2 assumes a constant value during the period of time selected, such a selection is not compulsory. It is also possible to use a switch-on increase which varies with time and which, starting from an initial value, decreases continuously or stepwise to the heating power associated with the respective speed. Likewise, a constant value or a value which varies with time and which increases from an initial value to the heating power can be chosen for the switch-on decrease.

Since the intensity of the air current is not controlled in dependence upon the vehicle speed, a change of the air current intensity will occur very rarely. It follows that, in contrast to conventional auxiliary heatings, temperature overshoots will hardly occur, and if this should actually be the case, they can be avoided by using the above-described switch-on increase or decrease.

In the hitherto described control of the temperature of the discharged hot air, the temperature of the incident air has not been taken into account. An improvement of the speed-dependent adaptation of the hot air temperature can be accomplished by taking into account the cold air temperature of the air to be heated.

Figure 3:
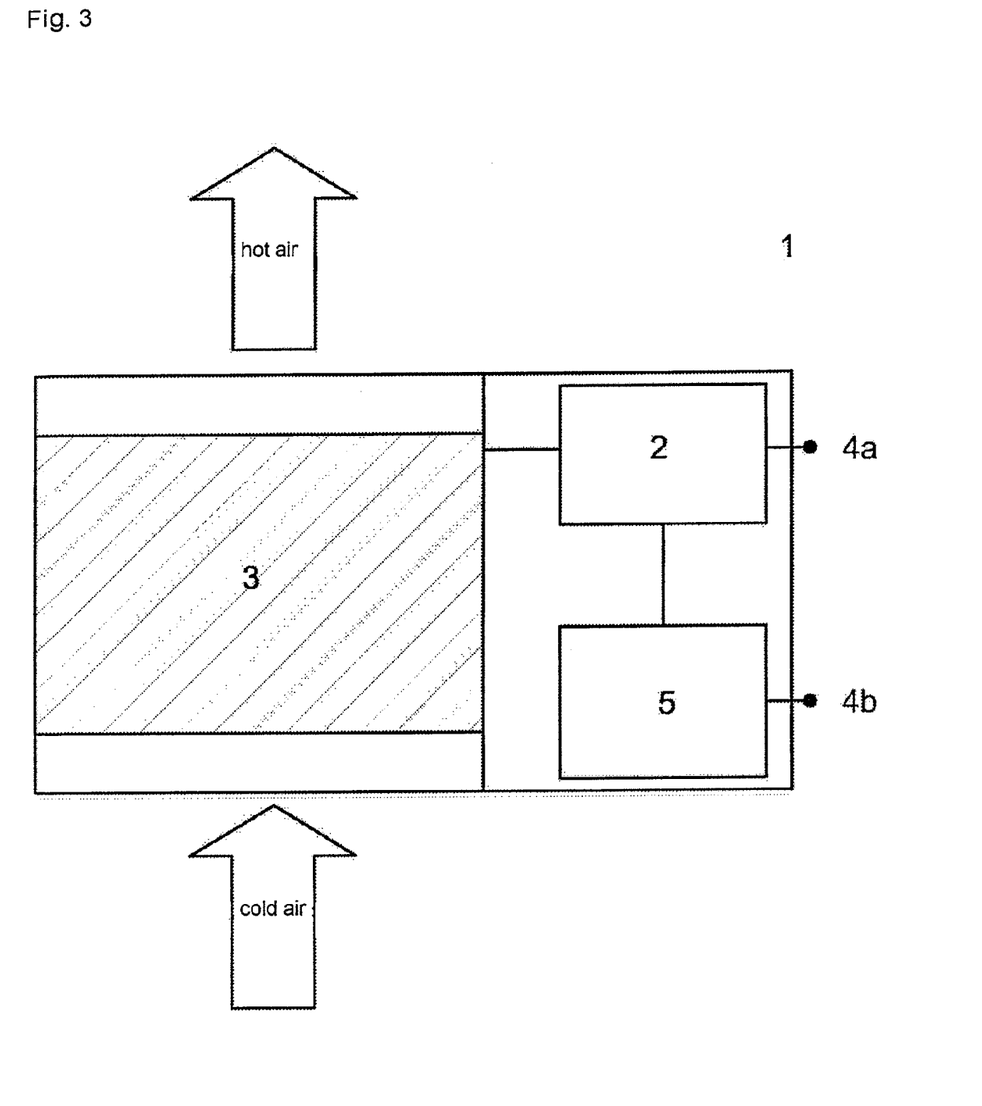
FIG. 3 shows a schematic structural design of the electric auxiliary heating according to the present invention with an additional temperature determination unit.

FIG. 3 shows the schematic structural design of the electric auxiliary heating comprising, in addition to the control unit 2 and the PTC heating element 3, a temperature determination unit 5. The temperature determination unit 5 is connected to the control unit 2 and supplies said control unit with a temperature value which reflects the temperature of the cold air incident on the heating element 3, said temperature value being used for determining the heating power of the PTC heating element.

For connecting the auxiliary heating 1 with other components in a vehicle, the auxiliary heating 1 is provided with terminals 4a and 4b. Making use of the terminal 4b, e.g. the temperature determination unit 5 can be connected to a temperature sensor provided in or on the vehicle. It is also possible to influence the behaviour of the control unit via the terminal 4a. This terminal can e.g. be used for transmitting user-defined predetermined values or signals of other vehicle components to the control unit 2.

As has been described hereinbefore, the auxiliary heating 1 can be connected to external devices of the vehicle directly in an analog or digital fashion, or by a data bus. For example, the temperature determination unit 5 can have supplied thereto via the bus a temperature value of an air conditioning system installed in the vehicle or of a sensor provided in the air duct and, on the basis of the value received, it can determine the cold air temperature of the air to be heated.

Likewise, it is also possible to update or service the control unit 2 and the temperature determination unit 5 via the terminals 4a and 4b. The person skilled in the art is, however, aware of the fact that the above-described use of the terminals is only an example and that the terminals offer a large number of possibilities of influencing the auxiliary heating. Nor is it necessary to provide the auxiliary heating with two separate terminals. The auxiliary heating may e.g. comprise only one terminal 4a which is connected to the control unit 2 and through which the control unit 2 is supplied with data. In this case, the data required by the temperature determination unit 5 are—if necessary—advanced by the control unit 2 to the temperature determination unit 5.

Figure 4:
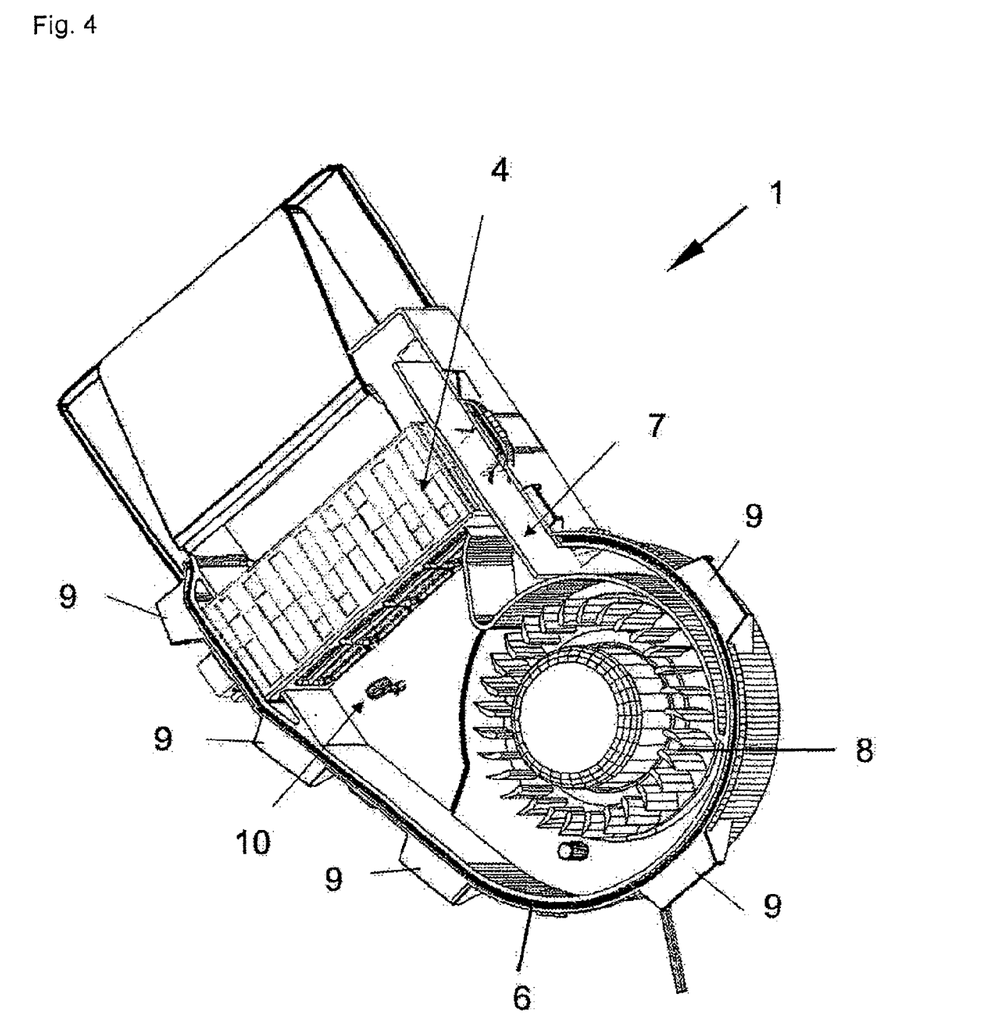
FIG. 4 shows a structural design of an electric auxiliary heating according to the present invention with an integrated blower.

FIG. 4 shows in detail an electric auxiliary heating according to the present invention with an additional blower which—according to an embodiment of the present invention—is provided with a temperature sensor for measuring the cold air temperature. As has been described hereinbefore, the use of such a temperature sensor is, however, not absolutely necessary.

The auxiliary heating 1 consists of a flat box 6 having arranged therein side by side a heating element 3, a circuit board with an electronic control 7 having integrated therein the control unit 2 and the temperature determination unit 5, a radial blower 8 and a temperature sensor 10. A number of mounting links 9 is additionally provided on the outer circumference of the box 6, said mounting links 9 being used for connecting the box 6 to complementary counterparts in the vehicle support body. The temperature sensor 10 is provided in the cold air section and connected to the electronic control 7. Furthermore, the electronic control 7 is connected, via lines which are not shown in detail, to the wiring system of the motor vehicle, the radial blower 8, or to suitable control elements which are preferably provided in the area of the seats or fittings. These control elements can be used for adjusting e.g. the hot air temperature and/or the speed of the blower independently of one another. Furthermore, the control 7 can be connected to a vehicle bus, in addition to or instead of the temperature sensor 10, said bus supplying to the control 7 ambient parameters available in the vehicle, such as the internal temperature, the outside temperature, the vehicle speed, the condition of the convertible top (open/closed), etc.

FIG. 4 illustrates clearly the many possibilities of using the present invention. Auxiliary heatings of the type shown in FIG. 4 are used at many locations in the vehicle. Auxiliary heatings are, for example, installed in the dashboard or in the area of the seating surface, backrest and neckrest of vehicle seats. Moreover, modern vehicles comprise a plurality of blower or heating modules so as to enhance the comfort. In view of the fact that the present invention determines the temperature of the incoming air separately for each individual one of the heating elements integrated in the vehicle, each heating element can operate self-sufficiently and can therefore be used locally.

Figure 5:
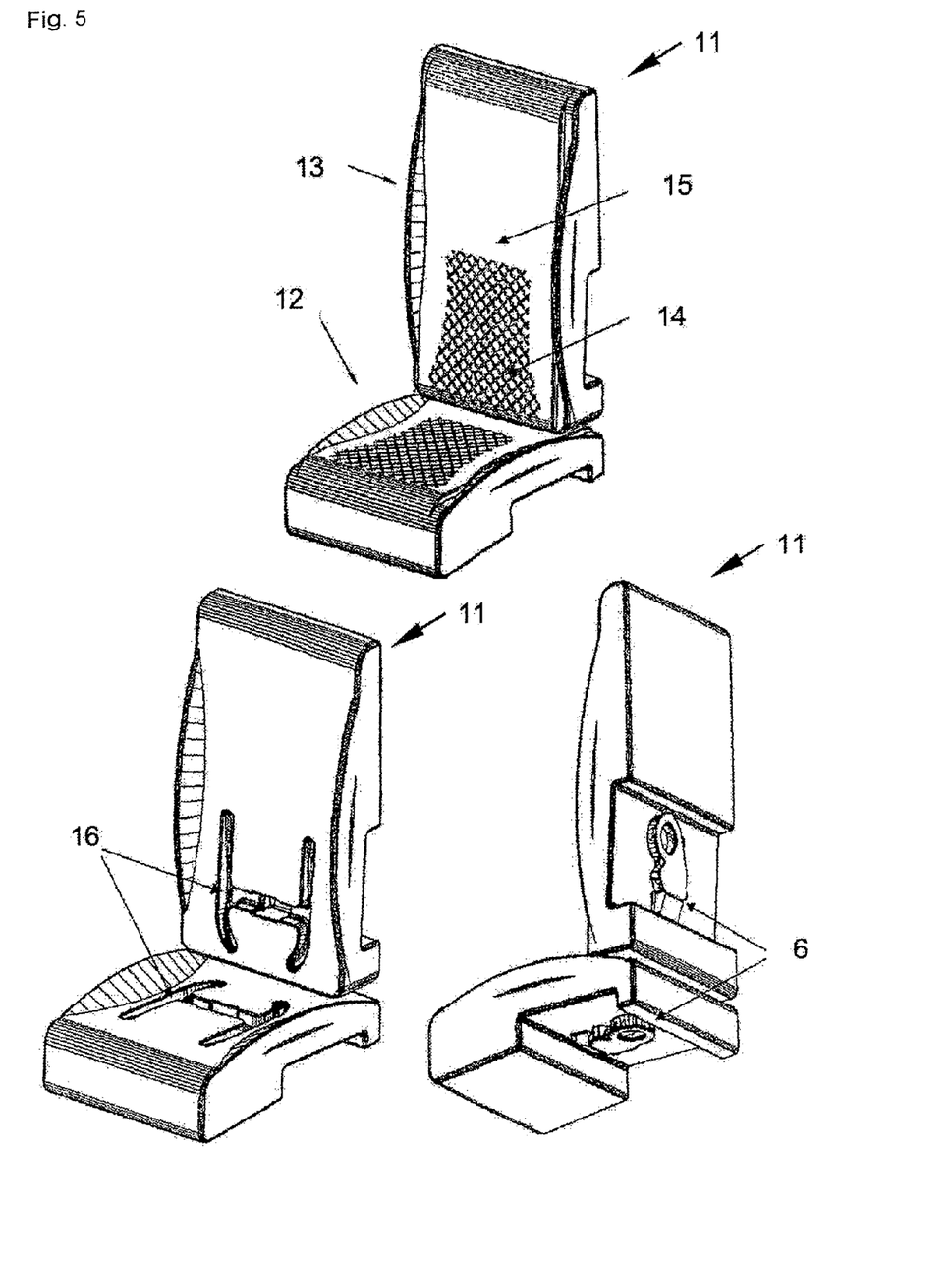
FIG. 5 shows a vehicle seat having an auxiliary heating installed therein.

A possible embodiment of the use of the auxiliary heating according to the present invention for heating a vehicle seat is shown in FIG. 5. The vehicle seat 11 comprises, as is usually the case, a seat cushion part 12 and a backrest 13. Both the seat cushion part 12 and the backrest 13 consist essentially of a support body; it will be particularly advantageous when this support body is made of rigid foam, e.g. polyurethane, but it may also be implemented as an innerspring seat; said support body has integrated therein the necessary fixing rails and frames. The surface of the rigid foam has glued thereon e.g. a knitted fabric 14 on which the outer cover 15, e.g. velour or leather, lies.

In the embodiment shown in FIG. 5, air flow passages 16 are provided in the rigid foam, said air flow passages 16 terminating in a chamber and being open towards the knitted fabric 14 along their entire lengths. At the back of the seat cushion part 12 and of the backrest 13, auxiliary heatings 6 are placed in openings provided for this purpose. The air heated by the auxiliary heatings is advanced through the air flow passages 16 to the vehicle passengers. Although FIG. 5 only shows heatings for the seat cushion part and the backrest part of the seat, the auxiliary heating according to the present invention can equally be used in seats including an air flow passage (or a plurality of air flow passages) for warming the neck area of the vehicle passenger. In this case, not only one, but e.g. three auxiliary heatings may be used, the respective auxiliary heatings supplying the seat, back or neck area of the person occupying the seat with hot air. In addition, the auxiliary heating can be used outside of the seat, e.g. for heating the rear of the passenger compartment of a motor vehicle.

When a plurality of auxiliary heatings is used in a vehicle, it will, however, not be necessary to provide each individual heating element 3 with an electronic control 7. For reducing the costs, the vehicle can be provided with only one electronic control which is connected to the individual heating elements, e.g. via a bus or in an analog manner, and which individually adjusts the heating power to be generated by the respective heating element.

Nor is it necessary that each individual heating element is provided with or connected to a separate blower 8. For reducing the costs and the vehicle weight, a plurality of heating elements can be connected to a single blower 8 which supplies air to the respective heating elements. The auxiliary heating according to the present invention can, for example, be arranged in air ducts used for conducting air from a central blower to air vents which are arranged further back in the vehicle. An individual blower is not necessary in such cases. In addition, a vehicle seat may comprise only one or a plurality of air ducts, which are connected to an external blower and which have provided therein one or a plurality of auxiliary heatings according to the present invention. The parameters of the cold air current supplied to the heating can be provided e.g. by the central air conditioning system.

As has already been mentioned hereinbefore, the heating power to be generated depends significantly on the cold air temperature of the air to be heated according to one embodiment of the present invention. The heating power to be generated can be determined by different methods, e.g. by mathematical equations containing the cold air temperature as a control quantity. This mathematical computing effort can be avoided when characteristics or characteristic fields are used. In the case of this method for determining the heating power, characteristics are determined, e.g. experimentally by measurements at the auxiliary heating, said characteristics reflecting the dependency of the heating power on the cold air temperature and the speed-dependent hot air temperature and allowing that the hot air discharged from the auxiliary heating is, during operation, optimally adapted to the respective vehicle speed.

The two determination methods may also be combined so as to improve the temperature determination. For example, subaspects of the mathematical computation, such as the temperature dependence of parameters, can easily be represented by characteristic fields. This will significantly reduce the computation effort, since precise formulae for the properties of the parameters do often not exist. The use of characteristics also has the advantage that characteristics can be updated, if necessary. By redetermining the characteristics, it will, for example, be possible to optimize the determination of the cold air temperature if improved measurement methods are used. This allows, in addition, an adaptation of the control of the heating power to varying properties of the auxiliary heating, e.g. to a possible soiling of said auxiliary heating.

For executing the functions described hereinbefore and hereinbelow, e.g. the control unit 2 and/or the temperature determination unit 5 may comprise a memory unit (not shown) containing control programs, function routines or characteristics, which define the temperature determination and the control of the heating element. In addition, one of said units or both said units include, in this case, a processor which executes the programs stored in the memory unit. The data contained in the memory units can also be updated via terminals 4a and 4b.

In the following, the mathematical method of computing the heating power to be generated will first be presented. For determining the heating power to be generated, it is expedient to predetermine hot air temperatures for the temperature of the air discharged from the heating and to determine then, with due regard to the cold air temperature, the heating power which is necessary for heating the discharged air to the desired hot air temperature.

The basis for this method is the following formula:

$$P = \dot{m} \cdot c_P \cdot \Delta T \quad \text{(i)}$$

wherein P is the is the heating power to be generated, $\dot{m}$ is the air mass flow through the heating element, $c_P$ is the heat capacity of the air, and $\Delta T := T_{discharge} - T_{cold}$ is the difference between the speed-dependent hot air temperature $T_{discharge}$, i.e. the desired temperature of the discharged hot air, and the cold air temperature $T_{cold}$.

For taking into account the efficiency with which the air to be heated takes up heat energy, an efficiency factor $\alpha$ can additionally be taken into account. In this case, the formula for computing the heating power is as follows:

$$P = \alpha \cdot \dot{m} \cdot c_P \cdot \Delta T. \quad \text{(ii)}$$

The cold air temperature required for computing the heating power can be determined in several ways. The easiest way of realizing this is the use of a temperature sensor which is located between the blower and the heating element and which measures the temperature of the incoming air to be heated. The use of such a sensor is, however, not necessary, since a large number of devices installed in the vehicle measure temperatures in or on the vehicle. For example, an air conditioning system installed in the vehicle measures a temperature which allows conclusions to be drawn about the temperature in the interior of the vehicle. When the blower, which supplies air to the auxiliary heating, sucks in air from the passenger compartment of the vehicle, e.g. in the recirculated air mode, the temperature measured by the air conditioning system represents a good value for the cold air temperature. When the air supply is operated in the flowthrough or fresh-air mode, the air sucked in is not air from inside the vehicle but fresh air from outside. In this case, the outside temperature measured by a temperature sensor provided on the vehicle will be a good measure for the cold air temperature. Starting from this observation, the present invention uses the ambient temperature $T_{ambient}$, which is measured by a temperature sensor within or on the vehicle, for determining the cold air temperature.

Since the ambient temperature (in or on the vehicle) does normally not precisely correspond to the cold air temperature (suck-in temperature), a factor F, which assesses the quality of a temperature provided by e.g. a bus (e.g. the internal temperature or the outside temperature), can additionally be introduced in the calculation. For example, if the temperature provided by the bus need not be adapted F=1 can be chosen. The quality factor, which reflects e.g. temperature differences between the temperature measurement and the cold air temperature, is used for correcting the ambient temperature so as to obtain the cold air temperature:

$$T_{cold} = F \cdot T_{ambient}. \quad \text{(iii)}$$

In formula (iii) is it assumed that the ratio between the ambient temperature and the cold air temperature can be determined through a factor. Such an unequivocal dependence is, however, not always given. It is also possible that the cold air temperature always differs from the ambient temperature by a specific differential value. For taking into account such a relationship between the ambient temperature and the cold air temperature, the present invention alternatively uses an additive correction factor f, as shown in the following formula:

$$T_{cold} = T_{ambient} + f. \quad \text{(iv)}$$

For additionally taking into account the temporal variation of the deviation of the ambient temperature from the cold air temperature, the correction factors may also be time-dependent. Such a time dependence will, for example, occur if the ambient temperature is measured e.g. at the dashboard or at the centre console, which are heated to a certain temperature within a very short period of time, whereas the air is sucked in e.g. in the vicinity of the floor of the passenger compartment, the temperature of said air rising only slowly to the temperature of the console. The cold air temperature can also be determined as follows by combining the correction factors F and f:

$$T_{cold} = F(t) \cdot T_{ambient} + f(t). \quad \text{(v)}$$

Up to now, the cold air temperature has been determined on the basis of only one temperature measured in or on the vehicle. The determination of the cold air temperature can, however, be improved by using a plurality of temperatures.

For determining the cold air temperature from a plurality of temperatures values, weighting factors and/or correlation factors are used, which express the influence of the individual temperatures on the cold air temperature. The sum of these factors is preferably 1. These correlation factors can be temporally constant as well as temporally variable. This allows an assessment of the quality of the values provided by the vehicle.

A correlation/weighting of a plurality of temperature values is exemplarily described hereinbelow on the basis of a combination of a measured passenger compartment temperature and the outside temperature.

When a vehicle is started and/or a heating module is switched on, an adjustment between internal and external temperatures will normally take place. If, for example, a passenger compartment temperature of 18° C. prevails in the vehicle with the convertible top or the windows closed, whereas the outside temperature is 10° C., the temperatures will be adjusted to a value between these two temperatures when the convertible top or a window is opened; this last-mentioned value is assessed.

The temperature of the air incident on the heating element can be determined by the following formula:

$$T_{cold} = F_{external}(t) \cdot T_{external} + F_{internal}(t) \cdot T_{internal}. \quad \text{(vi)}$$

As can be seen, the influence of the external and internal temperatures is taken into account by selecting suitable correction factors which are time-dependent in the above example. An additive correction factor, which reflects further variations, can additionally be added.

The above-mentioned formulae include a large number of correction factors for the mathematical description of which precise functional relationships are often not known. In particular, the exact values of the correction factors are vehicle-specific and they may change as the vehicle and the auxiliary heating age. In order to use for the correction factors nevertheless precise values or the time-dependency of the factors, the temperature determination unit 5 preferably stores characteristics which represent the dependency of the individual factors. These characteristics or characteristic fields are empirically determined by series of measurements. Individual values can thus be determined for each vehicle type, whereby the control of the heating power can be adapted to the vehicle in an optimal way.

As can be seen from formula (i), the exact temperature of the hot air discharged from the auxiliary heating can be determined exactly, whereby the speed dependency of the hot air discharged can be adjusted precisely. The adaptation of the heating power to the cold air temperature and the vehicle speed, which is necessary for this purpose, can be accomplished in various ways. A value table or a function can, for example, be stored in the memory unit or in one of the memory units, said value table or function assigning a predetermined heating power to specific speed/cold air temperature pairs of values.

It is also possible to store only a value table or a function which, for a preselected vehicle speed, assigns a respective specific heating power to various values of the cold air temperature. The speed-dependent variation of the heating power can in this case be accomplished by correction values which indicate how the stored heating power values are to be corrected in dependence upon the vehicle speed. The person skilled in the art is, however, aware of the fact that there are also other ways of realizing the speed- and cold air temperature-dependent control of the heating power.

Table 1 shows an exemplary table in which hot air temperatures for three comfort stages and four different speeds are listed.

TABLE 1 dependency of the hot air temperature on the vehicle speed and the comfort stage.
speed dependency of the hot air temperature

| vehicle speed | 0 km/h | 50 km/h | 90 km/h | 140 km/h |
|---|---|---|---|---|
| stage 1 | 25° C. | 30° C. | 35° C. | 40° C. |
| stage 2 | 30° C. | 35° C. | 40° C. | 45° C. |
| stage 3 | 35° C. | 40° C. | 45° C. | 50° C. |

The hot air temperature in the stationary condition of the vehicle is here used as a basic value for the hot air temperature, which is adjusted in dependence upon the vehicle speed. As can be seen from table 1, the hot air temperature to be achieved is preferably chosen such that it increases as the vehicle speed increases. Likewise, the hot air temperature is lowered when the vehicle speed decreases.

Even though table 1 only contains hot air temperatures for specific speeds, this does not mean that the present invention is limited to a stepwise adaptation of the hot air temperature to the vehicle speed. It is also possible to adapt the hot air temperature continuously to the vehicle speed, starting from the basic value. This can easily be realized by varying the hot air temperature linearly proportional to the vehicle speed, starting from a basic value. A non-linear dependency of the hot air temperature on the vehicle speed can, however, be used as well.

The person skilled in the art will also be aware of the fact that the above-described methods which are shown in table 1 and used for a speed-dependent control of the hot air temperature are only examples and that a large number of possible realizations of this control exists.

A speed dependency of the hot air temperature predetermined by the auxiliary heating 1 does often not suffice to satisfy the vehicle passenger's need for comfort. In particular, many vehicle passengers find it important that they have the possibility of adapting the hot air temperature of the air discharged from the heating to their own need for comfort as precisely as possible.

In order to satisfy this need, the control unit of the auxiliary heating preferably takes into account a predetermined temperature value which is determined on the basis of a value received from an external input unit and which is used for controlling the speed dependency of the hot air temperature.

The resultant predetermined temperature value is used as a basic value for the hot air temperature which is then, starting from the basic value determined by said predetermined temperature value, changed in dependence upon the vehicle speed. The predetermined temperature value can be generated in various ways. The user can, for example, input an exact temperature value which is transmitted to the control unit 2 as a predetermined temperature value. Upon receipt of a predetermined temperature value, the control unit 2 determines the current vehicle speed and uses the predetermined temperature value/vehicle speed combination as a basic value for the speed-dependent control of the hot air temperature; on the basis of this basic value, the hot air temperature is lowered when the speed decreases and raised when the speed increases. The basic value of the hot air temperature can here be varied and adjusted continuously by the vehicle passenger for each individual case.

In addition, the present invention is not limited to a user-defined predetermination of a basic value. Alternatively or additionally, it is also possible to determine the basic value automatically in dependence upon an external parameter, such as the outside temperature or the degree to which a convertible top or a window has been opened.

It may in certain cases not be possible to theoretically determine the above-described mathematical function or characteristic fields, which will then have to be determined empirically. Also a combination of a mathematical function and a stored characteristic field can be used for adapting the hot air temperature. By selecting suitable characteristic fields, a mathematical description for controlling the auxiliary heating may, however, also be dispensed with completely.

According to a further preferred embodiment of the present invention, the memory of the control unit or of the temperature determination unit has stored therein a characteristic field or a plurality of characteristic fields which, in dependence upon parameters, such as the cold air temperature, the vehicle speed and the like, indicate which heating power has to be generated by the heating element so that the air discharged from the heating will have a specific hot air temperature.

For determining the characteristic fields, measurement series are executed for a large number of input parameters, such as the cold air temperature, the magnitude of the air mass flow, the opening condition of the windows and of the convertible top, respectively, the hot air temperature and the like, so as to experimentally determine the heating power which has to be emitted by the heating element for heating the cold air to a target temperature. On the basis of characteristic features which are determined for each individual vehicle or type of vehicle, the control of the auxiliary heating can be adapted precisely to each individual vehicle or type of vehicle.

The determination of the characteristic fields can also be divided into individual sections. For example, the manufacturer of the auxiliary heating can experimentally ascertain the properties of said heating at the factory and store them in a first characteristic field, whereas the car manufacturer will subsequently determine a second characteristic field in which the vehicle-dependent influences find expression.

Nor is it necessary to determine a characteristic field for each individual vehicle. Since only very small deviations of the properties occur within one type of vehicle or one type of auxiliary heating, it will normally suffice to determine the characteristic fields for only one vehicle of a certain type of vehicles and for only one auxiliary heating of a certain type of auxiliary heatings.

In addition, the control by means of characteristic fields allows a simple modification of the control unit and/or of the temperature determination unit, since the data stored in these modules/memory units can easily be updated via terminals 4a and 4b.

Figure 6:
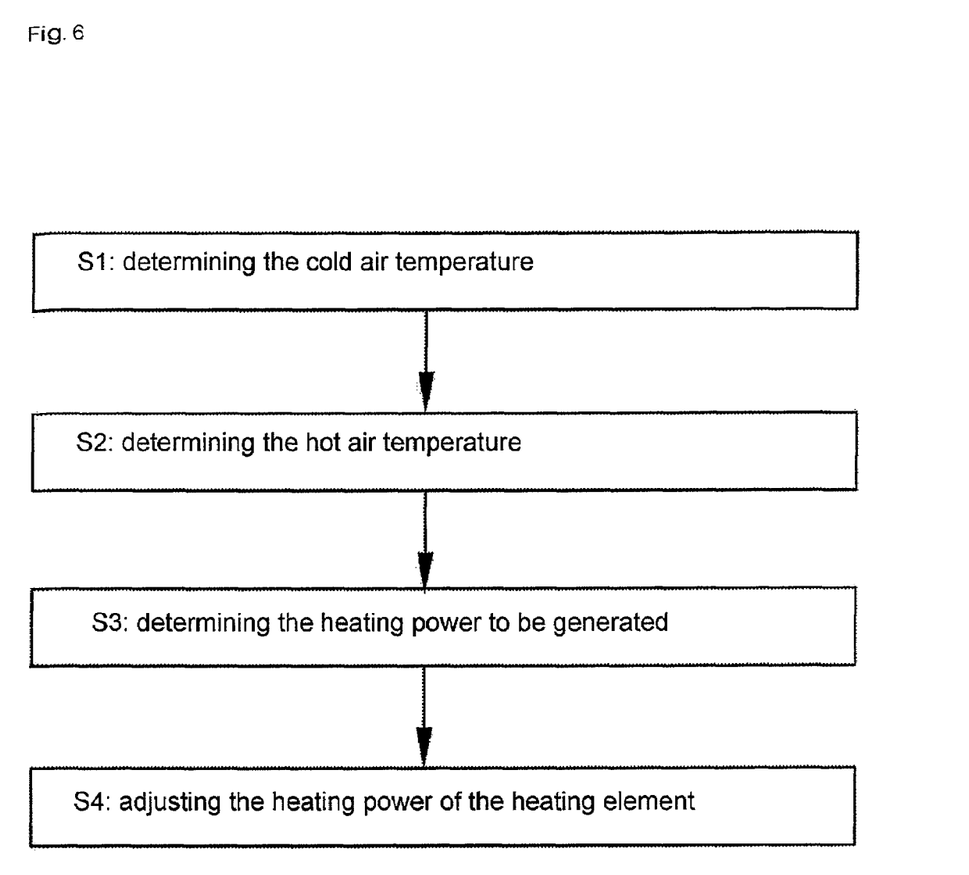
FIG. 6 shows a flowchart which illustrates the principle of the control of the electric auxiliary heating with due regard to the temperature of the air incident on the heating element.

FIG. 6 shows a flowchart which illustrates the basic principle of the control of the auxiliary heating with due regard to the hot air temperature. Based on the vehicle speed or on a parameter depending on the vehicle speed, e.g. the wheel speed, the aimed-at hot air temperature of the air discharged from the heating is determined in step S1. Subsequently, the temperature of the incoming cold air to be heated is determined in step S2. The person skilled in the art will, however, be aware of the fact that it is not necessary to determine the hot air temperature prior to the cold air temperature, but the cold air temperature can also be determined prior to the determination of the hot air temperature or both values can be determined simultaneously.

In dependence upon the cold and hot air temperatures determined in steps S1 and S2, the heating power to be generated by the heating element 3 is determined in step S3. This heating power determination can take place on the basis of the above-described formulae and/or by means of stored characteristic fields. When the heating power to be generated has been determined, the heating power of the heating element 3 is adjusted in step S4.

The control shown in FIG. 6 does not change the air current flowing through the auxiliary heating. It follows that a respective increase or decrease of the heating power will immediately result in a corresponding increase or decrease of the temperature of the air current discharged from the auxiliary heating. By taking into account the cold air temperature, it is additionally achieved that the hot air discharged will be heated precisely to a desired hot air temperature. Unpleasant excessive heating of the heated air current is reliably avoided in this way.

In view of the fact that motor vehicle heatings are normally accommodated in air ducts of the vehicle and supplied with fresh air by means of blowers, excessive heating may occur if the air inlet or outlet should be blocked or if the blower should fail. Since the air mass flow decreases or the air backs up in the heating element in these cases, the air contained in the air duct will be heated to a very high temperature when the heating power remains unchanged. Hence, the temperature of the discharged hot air may exceed 60° C. under certain circumstances.

In order to avoid problems through air current impediments, the control unit preferably executes an error recognition. To this end, the control unit has implemented therein a plausibility check which compares the actual speed of the blower with the voltage applied to the control input of the blower. Since a reduction of the air mass conveyed by the blower, caused e.g. by a blockage of the air inlet, has the effect that a lower voltage will be required for reaching a specific speed, this voltage value is a suitable indicator for problems in the air duct.

It follows that, if the voltage, perhaps minus a tolerance limit which will have to be specified, must be excessively reduced for adjusting a specific speed, the control unit 2 will use a lower air mass flow value for determining the heating power. The heating power may e.g. be switched back by one (comfort) stage so as to compensate the reduced air mass flow. If plausibility should still not be given by the reduction of the air mass flow value and the resultant heating power reduction, the air mass flow value taken into account will be reduced still further. This can be continued until the heating module has been switched off completely.

Operational faults within the air duct can, however, also be detected directly on the heating element. PTC heating elements have a temperature-dependent ohmic resistance which increases as the temperature of the heating element increases. Hence, the current flowing through the heating element will decrease when the voltage remains constant and the temperature of the heating element rises. When air flows through the heating element, the air will extract heat from the heating element; the heating element is, so to speak, cooled. This has the effect that the electric resistance of the heating element remains constant, although heating power is transferred to the air flowing through the radiator elements. It follows that, in the case of a continuous air current across the PTC element, the current flowing through the element must lie above a value that has to be specified. If the air current is disturbed, e.g. due to blockage or due to a defective blower, the current value will drop below the specified limit (PTC effect). This leads to a deactivation of the heating element.

Even though the above-described PTC effect leads to a passive deactivation of the heating element, the discharged hot air may, prior to said deactivation, perhaps be heated to temperatures which are unpleasant or bothersome for the vehicle passenger. In order to avoid this, the current across the heating element is preferably measured. If the value of the signal drops below a predetermined value, the heating element 3 will be deactivated by the control unit.

Although the auxiliary heating 1 according to the above-described embodiments is preferably implemented such that the temperature determination unit 5 and the control unit 2 are separate components, this special embodiment is not compulsory for an auxiliary heating 1 according to the present invention. Alternatively, the respective functions can also be integrated in a single component comprising e.g. a memory and a processor, which uses the control programs stored in the memory for temperature determination and which uses control routines for controlling the heating element.

For determining the influence of the slipstream, it is also possible to supply to the control unit 2 a signal containing information on the convertible top status or the opening degree of the windows. The control unit 2 is able to recognize by means of this signal whether the convertible top or the sunroof is closed or open, or which windows are open and how far they are open.

In addition, the present invention is not limited to a continuous adaptation of the basic value of the heating power and of the hot air temperature to external parameters, such as the outside temperature or the convertible top status. The adaptation of the basic value may also be executed stepwise, so that said basic value will only be adapted to a predetermined limit if values of the external parameter fall below or exceed the respective limit.

Summarizing, the present invention discloses an electric auxiliary heating which reliably avoids temperature overshoots of the heated air, especially during acceleration phases of the vehicle. To this end, the temperature of the discharged hot air is adjusted in dependence upon the vehicle speed. This is preferably done via a stored characteristic field by means of which a plurality of vehicle parameters, such as the vehicle speed, the opening condition of the convertible top, the outside temperature, etc., can easily be taken into account. The temperature of the incoming air can also be derived from temperature values which are already available in the vehicle. A user-friendly electric heating can be realized very easily in this way; this heating can preferably be used locally in the vehicle, e.g. in the vehicle seat or in the rear of the passenger compartment. Temperature fluctuations in the heated air can be avoided reliably and easily even in the case of dynamically varying operating conditions of the motor vehicle.

The invention claimed is:

1. An electric auxiliary heating unit for a motor vehicle, comprising:
   at least one PTC heating element for heating the air flowing through the auxiliary heating unit, wherein the air flow through the auxiliary heating unit is selectable;
   a control unit for adjusting the heating power of the at least one heating element, wherein the control unit adjusts the temperature of the air discharged from the auxiliary heating unit in dependence upon the vehicle speed;
   a temperature determination unit which determines the cold air temperature of the air to be heated by the auxiliary heating unit, wherein the control unit adjusts the heating power additionally in dependence upon the determined cold air temperature and the selectable air flow rate, and wherein the temperature determination unit determines the cold air temperature on the basis of at least one measured temperature value; and
   a sensor that measures the cold air temperature and that is arranged in an air intake section of the heating element between a blower for supplying the air to be heated and the heating element;
   wherein, when the heating power to be generated changes due to a selection of a new air flow rate, the control unit responds to the change by (i) setting the heating power to a value that is less or greater than the heating power assigned to the air flow rate for a predetermined period of time after the change and by (ii) setting the heating power to the value assigned to the air flow rate after the predetermined period of time.

2. An electric auxiliary heating unit according to claim 1, wherein the control unit adjusts, starting from a basic value, the heating power for varying the temperature of the heated air in dependence upon the vehicle speed.

3. An electric auxiliary heating unit according to claim 2, wherein the basic value is preselectable or is adjusted automatically in dependence upon an external parameter.

4. An electric auxiliary heating unit according to claim 2, wherein the control unit adjusts the basic value in dependence upon the outside air temperature.

5. An electric auxiliary heating unit according to claim 2, wherein the basic value is adjusted in dependence upon the preselectable air flow rate of the auxiliary heating unit.

6. An electric auxiliary heating unit according to claim 1, wherein the control unit includes a memory for storing a characteristic field indicating the dependency of the heating power on the vehicle speed.

7. An electric auxiliary heating unit according to claim 1, wherein the temperature determination unit determines the cold air temperature additionally on the basis of at least one correction factor for the measured temperature value.

8. An electric auxiliary heating unit according to claim 7, wherein the correction factor corrects the difference between the measured temperature value and the cold air temperature to be determined.

9. An electric auxiliary heating unit according to claim 7, wherein the correction factor corrects a temporal variation of the cold air temperature with respect to the measured temperature value.

10. An electric auxiliary heating unit according to claim 1, wherein the control unit deactivates the heating element if a current measured across the heating element drops below a predetermined limit.

11. An electric auxiliary heating unit according to claim 1, wherein the control unit reduces a heating power generated by the heating element if a voltage applied to the blower drops below a limit value.

12. An electric auxiliary heating unit according to claim 1, wherein the measured temperature value is provided by an air conditioning system of the motor vehicle.

13. An electric auxiliary heating unit according to claim 1, wherein the control unit comprises a memory having stored therein a characteristic field which describes the dependency of the heating power to be generated on input values, and wherein the control unit adjusts, in accordance with the values of said characteristic field, the heating power to be generated.

14. An electric auxiliary heating unit according to claim 1, further comprising an air duct connecting the blower and the heating element, wherein the temperature sensor is arranged in the air duct.

15. A motor vehicle seat comprising:
   a seat including a backrest;
   an air duct including at least one air discharge opening that is provided in the upper area of the backrest of the seat and that supplies air to the head, shoulder or neck area of a vehicle passenger seated on the seat, and further including
   an electric auxiliary heating unit which heats the air flowing through the air duct, the auxiliary heating unit including:
      at least one PTC heating element for heating the air flowing through the auxiliary heating unit, wherein the air flow rate through the auxiliary heating unit is selectable, and
      a control unit for adjusting the heating power of the at least one heating element, wherein the control unit adjusts the temperature of the air discharged from the auxiliary heating unit in dependence upon the vehicle speed,
      a temperature determination unit which determines a cold air temperature of the air to be heated by the auxiliary heating unit, wherein the control unit adjusts the heating power additionally in dependence upon the determined cold air temperature and the selectable air flow rate, wherein the temperature determination unit determines the cold air temperature on the basis of at least one measured temperature value, and
      a sensor that measures the cold air temperature and that is arranged in an air intake section of the heating element between a blower for supplying the air to be heated and the heating element;
      wherein, when the heating power to be generated changes due to a selection of a new air flow rate, the control unit responds to the change by (i) setting the heating power to a value that is less or greater than the heating power assigned to the air flow rate for a predetermined period of time after the change and by (ii) setting the heating power to the value assigned to the air flow rate after the predetermined period of time.

16. A method of controlling an electric auxiliary heating unit for a motor vehicle, wherein the auxiliary heating unit comprises at least one PTC heating element for heating the air which flows through the auxiliary heating, wherein the air flow rate is selectable, comprising the steps of:

adjusting the temperature of the heated air discharged from the auxiliary heating in dependence upon the vehicle speed;

determining the cold air temperature of the air to be heated by the auxiliary heating unit, and adjusting the heating power in dependence upon the determined cold air temperature and the air flow rate; and responding to the change of the heating power to be generated caused by a selection of a new air flow rate by (i) setting the heating power to a value that is less or greater than the heating power assigned to the air flow rate for a predetermined period of time after the change and by (ii) setting the heating power to the value assigned to the air flow rate after the predetermined period of time;

wherein the cold air temperature is measured using a sensor arranged in the air duct between a blower and the heating element.

17. A method according to claim 16, wherein, starting from a basic value, the heating power is adjusted for varying the temperature of the heated air in dependence upon the vehicle speed.

18. A method according to claim 17, wherein the basic value is preselected, or adjusted in dependence upon an external parameter.

19. A method according to claim 18, wherein the basic value is adjusted in dependence upon the outside air temperature.

20. A method according to claim 17, wherein the basic value is adjusted in dependence upon the preselectable air flow rate of the auxiliary heating unit.

21. A method according to claim 17, wherein a characteristic field is used for adjusting the heating power, said characteristic field indicating the dependency of the heating power on the vehicle speed.

22. A method according to claim 16, wherein the cold air temperature is determined additionally on the basis of at least one correction factor for the measured temperature value.

23. A method according to claim 22, wherein the correction factor corrects the difference between the measured temperature value and the cold air temperature to be determined.

24. A method according to claim 22, wherein the correction factor corrects a temporal variation of the cold air temperature with respect to the measured temperature value.

25. A method according to claim 16, further comprising deactivating the heating element if a current measured across the heating element drops below a predetermined limit.

26. A method according to claim 25, further comprising reducing a heating power to be generated by the heating element if a voltage applied to the blower drops below a limit value.

27. An electric auxiliary heating unit according to claim 1, wherein during the predetermined period of time, the generated heating power is either 1) maintained constant or 2) either reduced or increased to the heating power assigned to the air flow rate in a continuous or stepwise manner.

28. A method according to claim 16, wherein, during the predetermined period of time, the generated heating power is either 1) maintained constant or 2) reduced or increased to the heating power assigned to the air flow rate in a continuous or stepwise manner.

* * * * *